United States Patent
Biswas et al.

(10) Patent No.: US 6,248,217 B1
(45) Date of Patent: Jun. 19, 2001

(54) PROCESS FOR THE ENHANCED CAPTURE OF HEAVY METAL EMISSIONS

(75) Inventors: Pratim Biswas, Chesterfield, MO (US); Chang-Yu Wu, Gainsville, FL (US)

(73) Assignee: The University of Cincinnati, Cincinnati, OH (US)

( * ) Notice: Subject to any disclaimer, the term of this patent is extended or adjusted under 35 U.S.C. 154(b) by 0 days.

(21) Appl. No.: 09/056,952

(22) Filed: Apr. 8, 1998

Related U.S. Application Data (60) Provisional application No. 60/043,210, filed on Apr. 10, 1997.

(51) Int. Cl.[7] ............... C07C 1/00; B01D 53/00; C01D 1/00; C22B 43/00; A62D 3/00
(52) U.S. Cl. ............... 204/157.4; 204/157.15; 204/157.3; 204/157.51; 75/670; 588/256
(58) Field of Search ............... 204/157.44, 157.15, 204/157.21, 157.3, 157.4, 157.51; 422/186, 186.3; 75/670; 588/256

(56) References Cited

U.S. PATENT DOCUMENTS

| | | | |
|---|---|---|---|
| 4,045,316 | 8/1977 | Legan | 204/158 R |
| 4,210,503 | 7/1980 | Confer | 204/156 R |
| 4,416,748 | 11/1983 | Stevens | 204/157.1 P |
| 4,842,832 * | 6/1989 | Inoue et al. | 423/211 |
| 4,888,101 | 12/1989 | Cooper | 204/157.15 |
| 4,892,712 * | 1/1990 | Robertson et al. | 422/186 |
| 4,943,357 | 7/1990 | Van Antwerp et al. | 204/157.15 |
| 5,032,241 | 7/1991 | Robertson et al. | 204/157.15 |
| 5,035,784 | 7/1991 | Anderson et al. | 204/158.14 |
| 5,118,422 | 6/1992 | Cooper et al. | 210/636 |
| 5,126,111 | 6/1992 | Al-Ekabi et al. | 422/186.3 |
| 5,144,146 | 9/1992 | Wekhof | 250/492.1 |
| 5,174,877 | 12/1992 | Cooper et al. | 204/193 |
| 5,397,552 | 3/1995 | Weigold et al. | 422/186.3 |
| 5,417,825 | 5/1995 | Graham et al. | 204/158.2 |
| 5,449,443 | 9/1995 | Jacoby et al. | 204/157.3 |
| 5,556,447 | 9/1996 | Srinivasacher et al. | 75/670 |
| 5,607,496 * | 3/1997 | Brooks | 75/670 |
| 5,661,092 * | 8/1997 | Koberstein et al. | 427/515 |
| 5,888,926 | 3/1999 | Biswas et al. | 502/406 |

OTHER PUBLICATIONS

Timothy M. Owens and Pratim Biswas, Vapor Phase Sorbent Precursors for Toxic Metal Emissions Control from Combustors, Ind. Eng. Chem. Res., vol. 35, No. 3, pp. 792–798, No date available.

U. Kaluza and H.P. Boehm, Titanium Dioxide Catalyzed Photooxidation of Mercury, Journal of Catalysis, 1971, 22, pp. 347–358, No date available.

\* cited by examiner

*Primary Examiner*—Edna Wong
(74) *Attorney, Agent, or Firm*—Wood, Herron & Evans, L.L.P.

(57) ABSTRACT

This invention is directed to a process for forming a sorbent-metal complex. The process includes oxidizing a sorbent precursor and contacting the sorbent precursor with a metallic species. The process further includes chemically reacting the sorbent precursor and the metallic species, thereby forming a sorbent-metal complex. In one particular aspect of the invention, at least a portion of the sorbent precursor is transformed into sorbent particles during the oxidation step. These sorbent particles then are contacted with the metallic species and chemically reacted with the metallic species, thereby forming a sorbent-metal complex. Another aspect of the invention is directed to a process for forming a sorbent metal complex in a combustion system. The process includes introducing a sorbent precursor into a combustion system and subjecting the sorbent precursor to an elevated temperature sufficient to oxidize the sorbent precursor and transform the sorbent precursor into sorbent particles. The process further includes contacting the sorbent particles with a metallic species and exposing the sorbent particles and the metallic species to a complex-forming temperature whereby the metallic species reacts with the sorbent particles thereby forming a sorbent-metal complex under UV irradiation.

44 Claims, 4 Drawing Sheets

PROCESS FOR THE ENHANCED CAPTURE OF HEAVY METAL EMISSIONS

This application claims priority to U.S. Provisional Patent Application No. 60/043,210, entitled Enhanced Capture of Heavy Metal Emissions, and filed on Apr. 10, 1997.

This invention was made with Government support under Contract No. DE-FG22-95PC95222 awarded by the Department of Energy. The Government may have certain rights in this invention.

FIELD OF THE INVENTION

This invention relates to preventing air emissions of heavy metal species e.g., mercury ("Hg"), from a variety of different sources (e.g., combustion sources, coal combustion, incineration, chemical process industry and others). More specifically, it relates to using ultraviolet ("UV") radiation to oxidize Hg, typically in the elemental form in exhausts, and furthermore, in the vapor phase, to its ionic forms which are less volatile (such as oxides or chlorides). In addition, the present invention relates to the absorbing, adsorbing or entrapping a substance with a sorbent material. In another aspect of the invention, the process may be used to form a sorbent-metal complex by employing a sorbent precursor and then irradiating with ultraviolet radiation to oxidize the complex which enhances capture and binding of the mercury species.

BACKGROUND OF THE INVENTION

Toxic and heavy metals are one of the most problematic classes of contaminants due to their ubiquity and toxicity. Heavy metals represent a significant source of pollution when released into the environment. They are present in fossil fuels and ores, for example, and are released into the environment via airborne emissions during industrial processing of these materials, e.g., during incineration, or leach into soils and groundwater from ash and other residues when these materials are landfilled. Heavy metals from all sources present a major environmental concern.

Heavy metals are present in fossil fuels such as coal, oil and natural gas, in biomass, in ores and in wastes. Heavy metals are volatilized in the hot regions of process units such as boilers, incinerators or furnaces used for waste disposal, energy generation or metal recovery. Subsequently, as the gases are cooled, less volatile metal species (e.g., cadmium and lead) condense onto particles of ash entrained in the gas stream, while more volatile metals (e.g., arsenic and mercury) remain in the gas phase, where they end up as airborne emissions.

Heavy metals include, for example, arsenic, beryllium, lead, cadmium, chromium, nickel, zinc, mercury and barium. Most of these metals are highly toxic to humans and animals. Metal-contaminated wastes often also contain organic contaminants. Thus, treatment technologies for treating wastes contaminated with toxic metals preferably should be effective for treating organic waste as well.

Toxic metals may enter a combustion system in many physical and chemical forms, for example, as constituents of a hazardous or municipal solid waste to be incinerated or as trace quantities in coal. Once introduced into a combustion environment, a metal may undergo transformations to different phases as well as to different chemical species depending upon combustion conditions and the presence of chlorine and other reactive species. Also, at combustion temperatures, metals may be vaporized and then undergo nucleation to form a submicron aerosol, or the metal vapor may condense onto existing particles. These resulting primary particles, formed by nucleation or condensation, have been observed to have a diameter of approximately 0.02 Fm. Through growth by condensation of vapor or by coagulation with other particles, these particles ultimately may have a diameter of from about 0.02 Fm to about 1.0 Fm in the flue gas. For example, in one study on hospital waste incineration, a bimodal distribution in the flue gas was observed, and the particles having a diameter between about 0.1 Fm and 0.2 Fm accounted for 7% to 74% of the lead, 62%–77% of the cadmium, and 20%–80% of the zinc in the total particulate phase. (Kauppinen, E. 1. and Pakkanen, T. A., "Mass and Trace Element Size Distributions of Aerosols Emitted by a Hospital Refuse Incinerator", *Atmos. Environ.*, 24A, 423 (1990).

Unfortunately, flue gas cleaning equipment used in combustion systems is least efficient in capturing particles having diameters in the submicrometer size range. For example, electrostatic precipitators are used in many coal-fired combusters and typically exhibit the lowest collection efficiency for particles less than 1 Fm in diameter. Particles in these size ranges potentially pose a greater health threat than larger particles since they penetrate deeper into the lungs where the toxic materials come into contact with the blood. This potential adverse health impact of metal emissions from combustion devices is an appropriate incentive to investigate new methods and technologies for metal removal from waste gas streams. Furthermore, the United States Environmental Protection Agency (US EPA) has begun to regulate toxic metal emissions from combusters pursuant to Title III of the 1990 Clean Air Act Amendments which specifically lists eleven metals and their compounds as air toxics.

In an attempt to control such toxic metal emissions, researchers have proposed several control methods using various bulk solid sorbents to chemically adsorb various metals thereby reducing their discharge in particulate form into the atmosphere.

One such method includes combusting a metal contaminated waste in a fluidized bed of sorbent. (Ho, T., Chen, J., Hopper, J. and Oberacker, D., "Metal Capture During Fluidized Bed Incineration of Wastes Contaminated with Lead Chloride", *Combust. Sci. and Technol.*, 85, 101 (1992)). Other proposed methods include injecting a sorbent into the high temperature region of a combustion device (Scotto, M., Petersen, T. and Wendt, J., "Hazardous Waste Incineration: The In-Situ Capture of Lead by Sorbents in a Laboratory Down-Flow Combuster", 24th *International/Symposium on Combustion*, the University of Sydney, Sydney, Australia (1992), and passing a metal vapor at high temperatures through a packed bed of sorbent (Uberoi, M. and Schadman, F., "High Temperature Removal of Cadmium Compounds Using Solid Sorbents", *Environ. Sci. Technol.*, 25, 7, 1285 (1991); and Uberoi, M. and Schadman, F., "Sorbents for Removal of Lead Compounds from Hot Flue Gases", *AIChE Journal*, 36, 2, 307 (1990)). However, none of these methods adequately control the emission of mercury.

Mercury emissions from combustion sources have been a great concern (Chu, P. and Porcella, D. B. *Water, Air, Soil Pollut.* 1995, 80, 135–144; Krishnan, S. V., Gullett, B. K. and Jozewicz, W. *Environ. Sci. Technol.* 1994, 2(Y((Y), 1506–1512). Unlike most other heavy metals that are emitted in particulate forms, mercury has been reported to be released mainly in the elemental form in the vapor phase. Data for waste incinerators show the fraction from 10% to 90% depending on the waste composition and operating conditions (Lindqvist, O. *Waste Management & Research.*

1986, 4, 35–44; Bergstrom, J. G. T. *Waste Management & Research*, 1986, 4, 57–64; Reimann, D. O. *Waste Management & Research*, 1986, 4, 45–56; Hall, B., Schager, P. and Lindqvist, O. *Water, Air Soil Pollut.*, 1991, 56, 3–14; Livengood, C. D., Huang, H. S., Mendelsohn, M. H. and Wu, J. M. *PETC=s 10th Annual Coal Precapture, Utilization and Environmental Control Contractors Conf.*, July 1994). Data for coal-fired power plants show a higher fraction, in some cases even over 95% (Meij, R. *Water, Air, Soil Pollut.* 1991, 56, 21–33; Larjava, K., Laitinen, T., Vahlman, T., ArtMann, S., Siemens, V., Broekaert, J. A. C. and Klockow, D. *Intern. J Environ. Anal. Chem.*, 1992, 49, 73–85; Morency, J. R. *PETC=s 10th Annual Coal Precapture, Utilization and Environmental Control Contractors Conference*, July 1994, Vogg, H., Braun, H., Metzger, M. and Schneider, J. *Waste Management & Research*, 1986, 4, 65–74). Vapor phase elemental mercury is negligibly captured in typical air pollution control devices. Once emitted into the atmosphere, mercury may undergo various biological processes in the atmosphere to form even more toxic mercury species such as methyl mercury. It may also bioconcentrate in vegetation and fish. The consumption of these produce and fish leads to adverse health effects in human beings and predator animals (Seigneur, C., Wrobel, J. and Constantinou, E. *Environ. Sci. Technol.*, 1994, 28(9), 1589–1597; Hall, B., Lindqvist, O. and Ljungstrom, E. *Environ. Sci. Technol.* 1990, 24(1), 108–111; Aizpun, B., Fernandez, M. L., Blanco, E. and Sanz-Medel, A. *J. Anal. At. Spectrom.* 1994, 9, 1279–1284). Due to its high toxicity, stringent regulations have been set for mercury emissions (Quimhy, J. M. *86th Annual Meeting of Air & Waste Management Assoc.*, Paper 93-MP5.03, Denver, Colo., Jun. 13–18, 1993; 40 CFR 266 (1992); Clarke, M. J. *86th Annual Meeting of Air & Waste Management Assoc.*, Paper 93-RP 154.01, Denver, Colo., Jun. 13–18, 1993; Linak, W. P. and Wendt, J. O. L. *Prog. Energy Combust. Sci.*, 1993, 19, 145–185; Trichon, M. and Chang, R *Proc.* 1992 *Incin. Conf.*, Albuquerque, N. Mex., 1992, 255–259), and effective control of mercury emission is extremely important.

Environmental standards for particulate and total mercury emissions by coal-fired power plants, petroleum refineries, chemical refineries, incinerators, metallurgical operations, thermal treatment units, and other particulate- and mercury-emitting facilities are becoming increasingly more demanding. New regulations are currently under development not only to amend existing regulations to reduce further permissible levels of total mercury emissions for such facilities but also to regulate total mercury emissions from a wide variety of other types of operations not presently subject to such regulations.

To effectively control mercury emissions, understanding the behavior of mercury in the combustion environment is very important where speciation plays a critical role (Galbreath, K. C. and Zygarlicke, C. J. *Environ. Sci. Technol.*, 1996, 30(8), 2421–2426). Different species possess different chemical and physical properties that result in different fates. For example, mercury chloride is soluble and may be washed out by gas washing devices such as scrubbers. This has been reasoned for the cause of the higher capture efficiencies in certain waste incinerators because chlorine content is typically high in the waste (Lancia, A., Musmarra, D., Pepe, F. and Volpicefli, G. *Combust. Sci. Tech.*, 1993, 93, 277 289; Peterson, J., Seeger, D., Skarupa, R., Stohs, M. and Hargrove, B. and Owens, D. *87th Annual Meeting of Air & Waste Management Assoc., Paper 94-RP114B.01*, Cincinnati, Ohio, Jun. 19–24, 1994). Mercury oxide, on the other hand, is less volatile and may form particles. Thus, it can be potentially captured in particulate control devices. As oxidized forms of mercury can be more easily removed from the gas stream than the elemental mercury, they have been proposed as the preferred forms to be generated in combustion facilities (Wu, C. Y., Arar, E. and Biswas, P. *89th Annual Meeting of the Air & Waste Management Assoc.*, Nashville, Tenn., Jun. 23–28, 1996; Helfritch, D., Harmon, G. and Feldman, P. *89th Annual Meeting of Air & Waste Management Assoc.*, Paper 96-ES96.41, Nashville, Tenn., Jun. 23–28, 1996). However, a Hg atom has a $5d^{10}6s^2$ closed shell electronic structure which is isoelectronic to He ($1s^2$) (Haberland, H., von Issendorff, B., Yufeng, J., Kolar, T. and Thanner, G. Z. *Phys. D.*, 1993, 26, 8–12; Brechignac, C., Broyer, M., Cahuzac, Ph., Delacretaz, G., Labastie, P., Wolf, J. P. and Woste, L. *Pllys. Rev. Lett.*, 1988, 60(4), 275–278; Uchtmann, H., Rademann, K. and Hensel, F. *Ann. Physik Leipzig*, 1991, 48(1–3), 207–214). This structure results in its unusual nonreactivity among metals. Past studies have confirmed this point by showing extremely slow or no oxidation in air at high temperatures. Other studies show that oxidation occurs only with strong oxidants such as $NO_2$, HCl or $Cl_2$ (Hall, B., Schager, P. and Lindqvist, O. *Water, Air Soil Pollut.*, 1991, 56, 3–14; Hall, B., Lindqvist, O. and Ljungstrom, E. *Environ. Sci. Technol.* 1990, 24(1), 108–111; Hall, B., Schager, P. and Ljungstrom, E. *Water, Air Soil Pollut.*, 1995, 81, 121–134). Nevertheless, these reactants can not be used to control mercury emissions since they themselves are also regulated pollutants.

A lot of studies to capture elemental mercury by other approaches have also been conducted. Currently, the mostly widely used technique is activated carbon, and activated carbon impregnated with sulfur, chlorine or iodine is found to be the most effective. However, the use of activated carbon is limited because of its poor capacity, low applicable temperature range, regeneration and slow adsorption rate (Otani, Y., Kanaoka, C., Usul, C., Matsui, S. and Emi, H. *Environ. Sci. & Technol.*, 1986, 20(7), 735–738). The other technique proposed is corona discharge (Urabe, T., Wu. Y., Nagawa, T. and Masuda, S. *Seiso Giho*, 1988, 13, 12–29). Radicals such as OH, O and $O_3$ are generated in such an environment which then oxidize elemental mercury. Very high efficiency of oxidation has been demonstrated by using pulsed, positive voltage corona with energy density 10 w/cfm (Helfiitch, D., Harmon, G. and Feldman, P. *89th Annual Meeting of Air & Waste Management Assoc.*, Paper 96-ES96.41, Nashville, Tenn., Jun. 23–28, 1996). However, no data of the particle size distribution resulting from the subsequent nucleation of mercury oxide particles are available. Typically, metallic particles formed by nucleation in combustion environments are enriched in the submicrometer regime (Linak, W. P. and Wendt, J. O. L. *Prog. Energy Combust. Sci.*, 1993, 19, 145–185), and it is well known that typical particulate control devices have a minimum of collection efficiency in this regime (Flagan, R. C. and Seinfeld, J. H. 1988, *Fundamentals of Air Pollution Engineering*, Prentice Hall, Englewood Cliffs, N.J.). Therefore, alternative approaches need to be developed.

Electrostatic precipitators and filters are two common particulate removal systems for removing particulate material from a gas stream. In electrostatic precipitators, electrodes impart a negative electrical charge to the particulate material. The charged particulate material migrates to positively charged collection plates where the material is collected. The collected particulate material is periodically removed from the collection plates for disposal.

However, electrostatic precipitators are unable to remove effectively particulate material having inadequate resistivity to retain an electrical charge. For particulate material that can retain an electrical charge, the particle collection efficiency of electrostatic precipitators has been found to decrease over time. It is believed that the decrease is primarily a result of electrical spark over from the collection plates to the electrodes.

While the above-described particulate removal systems remove particulate material, neither electrostatic precipitators nor filters remove vaporous forms of mercury from the gas stream or these systems have a low efficiency of capture of submicrometer sized particles. This necessitates modification of the systems for mercury removal. In particular in coal-fired power plants, a variety of sorbents are often introduced upstream of the filter to remove mercury from the flue gas. The sorbents are recovered by the filter as part of the collected particulate material layer.

The efficiency of sorbents frequently utilized for mercury removal in facilities of the above-noted nature are often inadequate for meeting the increasing regulatory demands concerning total mercury emissions. Additionally, such sorbents typically do not remove all forms of mercury. Since certain types of fuels or raw materials produce only certain forms of mercury when consumed, it is therefore often necessary to base the selection of the specific sorbent to be used upon the chemical composition of the fuel or raw material to be consumed in the operation.

Sorbent particles have been demonstrated to be effective to capture certain toxic metals in combustion environments (Uberoi, M. and Shadman, F. *AIChE Journal*, 1990, 36(2), 307–309; Uberoi, M. and Shadman, F. *Ind Eng. Chem. Res.*, 1991, 30, 624–631; Ho, T. C., Chen, C., Hopper, J. R. and Oberacker, D. A. *Combust. Sci. Tech.*, 1992, 85, 101). Compared with traditional bulk sorbent particles used in a fixed bed or fluidized bed, in-situ generated particles have been shown to possess a higher capture efficiency (Owens, T. M. and Biswas, P. *Ind. Eng. Chem. Res.* 1996, 35(3), 792–798; Owens, T. M. and Biswas, P. *J. Air Waste Manage. Assoc.*, 1996, 46, 530–538) as well as to suppress the formation of submicrometer particles (Gulett, B. K. and Ragnunathan, K. *Energy & Fuels*, 1994, 8, 1068–1076). It is known that radicals are generated on titania surface when ultraviolet (UV) radiation is applied, and these radicals can be used to convert chemicals. Bulk solid sorbents have been widely used to remove organic pollutants (Jacobsen, A. E. *Ind Eng. Chem.* 1949, 41, 523) or heavy metals in waste water (Aguado, M. A., Gimenez, J. and Cervera-March, S. *Chem. Eng. Comm.*, 1991, 104, 71–85). Kaluza and Boehm (Kaluza, U. and Boehm, H. P. *J. Catal.* 1971, 22, 347) applied titania as a thin film on a glass slide with a drop of mercury. Yellow color (representing oxide formation) was observed after 1.5 hr with UV in the range of 410–390 nm at 60° C. They reasoned the oxidation was due to the OH groups on titania surface under the presence of oxygen.

Additionally, in an attempt to control emissions of toxic organic compounds, many researchers have utilized irradiation to oxidize the organic compounds to less toxic or nontoxic products. U.S. Pat. No. 5,417,825, Graham, issued May 23, 1995, provides a method and apparatus for photothermal detoxification of toxic organic compound. The apparatus includes a thermally insulated reaction vessel maintained at a temperature greater than 200° C., and a radiation source such as arc emission or a laser which irradiates the compound at a wavelength of less than 300 nm for at least 2 seconds to produce nontoxic reaction products. While this patent discloses the breakdown of a wide variety of toxic organic compounds, the reference does not mention the use of radiation to eliminate mercury vapors.

U.S. Pat. No. 4,210,503, Confer, uses ultraviolet lamps to irradiate a gas stream containing vinyl chloride, forming less hazardous materials which are then absorbed in a scrubber. Legan, U.S. Pat. No. 4,045,316, discloses a process for decontaminating gaseous or vaporous streams of vinyl chloride in which the streams are exposed to heat and radiation.

U.S. Pat. No. 5,449,443, issued Sep. 12, 1995, discloses a method whereby organic pollutants and bioaerosols in a gaseous stream are oxidized by exposure to light (e.g., UV light) in the presence of semiconductor catalyst particles or coatings supported on flexible strips suspended in the gaseous stream.

U.S. Pat. Nos. 4,888,101 and 5,118,422, Cooper, describe a system for photocatalytically modifying a chemical composition and water purification. The system includes semiconductor powder dispersed and trapped in a layer of glass wool. U.S. Pat. Nos. 4,892,712 and 5,032,241, Robertson, describe a device for purifying water or air. The device includes a high surface area matrix with photoreactive metal semiconductor bonded to the matrix. U.S. Pat. No. 4,943,357, Van Antwerp, describes a method of photodegrading a metallic chelate complex in an aqueous solution. There is no disclosure of a method for removing organic contaminants from air. U.S. Pat. No. 5,035,784, Anderson, describes a process for degrading complex organic molecules by photocatalysis. U.S. Pat. No. 5,126,111, Al-Ekabi, describes a method of removing, reducing, or detoxifying organic pollutants from water or air with a photoreactive metal semiconductor material, while simultaneously contacting the photoreactive material with a substance that accepts electrons. U.S. Pat. No. 5,144,146, Wekhof, describes a method for destroying toxic substances using UV radiation. No description is made of a photocatalyst. U.S. Pat. No. 5,174,877, Cooper, describes apparatus for photocatalytic treatment of liquids. No description is made of treatment of air.

U.S. Pat. No. 4,416,748, Stevens, issued Nov. 22, 1983, discloses that the content of $SO_2$ and/or $NO_{[x]}$ in flue gas is reduced by irradiating the flue gas in admixture with $NH_3$ with ultraviolet at wavelengths between 170 and 220 nm. The present invention relates to a process for the reduction of the content of $SO_2$ and/or the nitrogen oxides NO and $NO_2$ (sometimes referred to by the general term "$NO_{[x]}$") in flue gases.

U.S. Pat. No. 5,397,552, Weighold et al., issued Mar. 14, 1995, discloses a method of photochemically oxidizing gaseous organic compounds, an apparatus for photochemically oxidizing gaseous organic compounds, a lining insert for an apparatus for photochemically oxidizing gaseous organic compounds, and a method for producing such a lining. The principal method comprises: a) exposing gaseous organic compounds to ultraviolet light to oxidize the gaseous organic compounds into gaseous oxidation products; and b) reacting the gaseous oxidation products with an internal surface of a reaction chamber, the internal surface comprising a dry porous cementitious and chemically sorbent material which is chemically reactive with the gaseous oxidation products, with the gaseous oxidation products being reacted with the dry porous cementitious material to produce solid reaction products incorporated in sidewalls of the chamber.

U.S. Pat. No. 5,556,447, Srinivasachar et al., issued Sep. 17, 1996, describes a process for treating wastes contaminated by toxic metals and/or organic materials. The process involves heating the metal-contaminated wastes to a temperature sufficient to volatilize the metals. This temperature is also high enough to destroy or volatilize organic contaminants. The metal vapors are contacted with a sorbent which is reactive with the metals and sequesters them, thereby forming a non-leachable complex which can be disposed as non-hazardous conventional waste.

The art has lacked a relatively simple, highly efficient method for effectively removing mercury vapors from an exhaust in a continuous process. Therefore, it would be extremely desirable to have a method of reducing toxic metal emissions from a combustion system in which the system removes mercury more efficiently, thereby providing enhanced capture and subsequent storage of toxic metals at a reduced cost. The invention disclosed and claimed herein achieves these advantages in a manner not disclosed or suggested by the prior art.

SUMMARY OF THE INVENTION

This invention relates to preventing air emissions of heavy metal species, e.g., mercury ("Hg"), from a variety of different sources (e.g., combustion sources, coal combustion, incineration, chemical process industry and others). More specifically, it relates to using ultraviolet ("UV") radiation to oxidize Hg, typically in the elemental form in exhausts, and furthermore, in the vapor phase, to its ionic forms which are less volatile (such as oxides or chlorides).

In one embodiment, the present invention relates to the absorbing, adsorbing or entrapping a substance with a sorbent material, and more particularly, to forming a sorbent-metal complex by employing bulk sorbent materials and using ultraviolet ("UV") radiation to oxidize the complex to enhance capture and binding of the mercury species.

In another embodiment, the present invention relates to the absorbing, adsorbing or entrapping a substance with a sorbent material, and more particularly, to forming a sorbent-metal complex by employing a sorbent precursor resulting in the in situ generation of a sorbent and using ultraviolet ("UV") radiation to oxidize the complex to enhance capture and binding of the mercury species.

In another aspect of the invention, the process may be used to form a sorbent-metal complex by employing a sorbent precursor and then irradiating with ultraviolet radiation to oxidize the complex which enhances capture and binding of the mercury species. The process includes oxidizing a sorbent precursor and contacting the sorbent precursor with a metallic species. The process further includes chemically reacting the sorbent precursor and the metallic species, thereby forming a sorbent-metal complex.

In one particular aspect of the invention, at least a portion of the sorbent precursor is transformed into sorbent particles during the oxidation step. These sorbent particles then are contacted with the metallic species and chemically or photochemically reacted with the metallic species, thereby forming a sorbent-metal complex.

Another aspect of the invention is directed to a process for forming a sorbent-metal complex in a combustion system. The process includes introducing a sorbent precursor into a combustion system and subjecting the sorbent precursor to an elevated temperature sufficient to oxidize the sorbent precursor and transform the sorbent precursor into sorbent particles. The process further includes contacting the sorbent particles with a metallic species and exposing the sorbent particles and the metallic species to a complex forming temperature whereby the metallic species reacts with the sorbent particles thereby forming a sorbent-metal complex.

This invention provides many benefits and advantages. For example, the sorbent precursors employed in the invention do not suffer the mass transfer limitations encountered when using bulk solid sorbents. When a vapor or aerosol phase sorbent precursor is fed into a combustion system, the sorbent precursor quickly disperses throughout the combustion chamber and is able to form a high number of particles having an extremely high surface area per unit mass, thereby offering a much more efficient sorbent for capturing toxic metal emissions.

These and other benefits and advantages will become apparent upon review of the following brief description of the drawings and detailed description of the invention.

DETAILED DESCRIPTION OF THE PREFERRED EMBODIMENTS

The present invention relates to a process for remediating waste, soils or other material which is contaminated with toxic heavy metals. Stabilized products are potentially formed from which the metals cannot leach. The present process can be utilized with existing industrial processes, such as coal combustion since coal may contain heavy metals such as lead, mercury or arsenic, and combustion of the coal produces output streams containing ash and flue gases which are contaminated with these metals.

The terms "heavy metals" or "toxic metals" as used herein, refer generally to elements including, for example, arsenic, beryllium, barium, cadmium, chromium, lead, mercury, nickel and zinc. As used herein, the terms encompass the elemental form of these metals as well as organic and inorganic compounds and salts containing them. Many of these elements and compounds are poisonous to human, animal and/or aquatic life.

In the preferred embodiment, this invention is useful in preventing air emissions of mercury ("Hg") containing compound from a variety of different sources (e.g., combustion sources, coal combustion, incineration, chemical process industry and others). More specifically, it relates to using ultraviolet ("UV") radiation to oxidize Hg, typically in the elemental form in exhausts, and furthermore, in the vapor phase, to its ionic forms which are less volatile (such as oxides or chlorides). In addition, the present invention relates to the absorbing, adsorbing or entrapping a substance with a sorbent material. In another aspect of the invention, the process may be used to form a sorbent-metal complex by employing a sorbent precursor and then irradiating with ultraviolet radiation to oxidize the complex which enhances capture and binding of the mercury species. As used herein, "sorbent" refers to a substance that absorbs, adsorbs, or entraps another substance.

As used herein, "mercury-containing compounds" refers to mercury in whatever form, e.g., whether elemental or compounded with other elements. Examples of mercury-containing compounds include elemental mercury, mercuric chloride, organomercuric compounds, other ionic and oxidized forms of mercury, and mixtures thereof Generally, the mercury-containing compounds have a concentration in the input gas stream ranging from about 0.1 to about 1,000 ppb (v/v). Hg or the word mercury means said element either as vapor of the metal or as a chemical compound or complex.

In another aspect of the present invention, a process is provided for photocatalytic conversion of mercury-containing compounds contaminating a gaseous stream, the process comprising the steps of
(a) oxidizing a mercury-containing compound to its ionic form by irradiating with ultraviolet radiation in the presence of sorbent materials;
(b) contacting said sorbent materials with the mercury-containing compound;
(c) allowing the sorbent materials containing ionic forms of the mercury-containing compounds to aggregate; and
(d) collecting the formed aggregates by a collector or electrostatic precipitator.

In another aspect of the invention, the sorbent-metal complex may be used wherein radiation is used to oxidize the metal species to an oxidized state and wherein the radiation further helps the complexation of vapor phase metal to the sorbent resulting in a very low leachability compound.

In another aspect of the present invention, for a process for photocatalytic conversion of mercury contaminants in a gaseous stream, the process comprising the steps of:
(a) oxidizing a sorbent precursor;
(b) oxidizing a mercury-containing compound by irradiating with ultraviolet radiation;
(c) contacting said sorbent precursor with the mercury-containing compound; and
(d) irradiating said sorbent precursor and the mercury-containing compound with
ultraviolet radiation thereby forming a sorbent-mercury complex.

Generally, the process comprises irradiating the flue gas with ultraviolet radiation at wavelengths between 170 and 500 nm. Preferably, the ultraviolet radiation is at wavelengths between about 185 and about 410 nm. More preferably, the ultraviolet radiation is of a wavelength between about 290 and about 400 nm. Most preferably, the ultraviolet radiation is of a wavelength between about 320 and about 390 nm.

The source of radiation is typically located outside of a reaction vessel or duct and emits light through a quartz window. The radiation source may comprise arc emission such as xenon, mercury, or xenon-mercury lamps, a pulsed or continuous laser, or additionally, corona discharges as typically used in electrostatic precipitators could be used as a source of UV radiation. Such sources of radiation are capable of going further into the UV region than solar radiation, which results in greater efficiency of the detoxification reaction. Other available sources of ultraviolet light may be used as long as they provide the required radiation.

The form of ultraviolet source to be employed will depend on the desired wavelength range. One class of UV lamps which may be employed comprises low pressure mercury arc lamps. These provide a strong emission line at 184.9 nm, along with a strong emission line at 253.7 nm, and weaker emissions at other wavelengths. A further class of UV lamps which may be employed consists of high pressure short arc mercury-xenon lamps. These provide an output which is a continuous spectrum from 190 nm to above 300 nm and no emission at any wavelength lower than 190 nm.

Thus, for example, when the flue gas mixture is irradiated with ultraviolet light in the wavelength range of 170 to 400 nm about 80% of the Hg is removed when the mixture is irradiated continuously for 10 millisec at a light intensity of about $10^{20}$ photon/cm$^2$/sec, or is irradiated continuously for 100 millisec at an intensity of about $10^{29}$ photon/cm$^2$/sec, these light intensities being typical of those achievable with the preferred forms of ultraviolet lamps. Typically, the flow rate of flue gases through the normal uniform cross-section ductwork encountered in e.g. conventional coal-fired power stations is of the order of 10 m/sec, thus requiring that the irradiated lengths of ductwork should be of the order of from about 10 cm to about 1 m.

More generally, therefore it will normally be desired to subject the reaction mixture to a total quantity of radiant energy flux in range of about $10^{18}$ to about $10^{19}$ photon/cm$^2$ of the irradiated area of the flue gas duct during the photolysis reaction.

The optimum conditions required for the photolysis reaction for any given process will depend upon the flue gas composition, the duration of the exposure to the ultraviolet radiation and the radiation intensity of the source of ultraviolet radiation.

It is anticipated that the ultraviolet light sources will produce considerable heat which must be removed. Therefore, a cooling jacket may be provided about the reaction chambers or ducts. Ambient air or some other fluid is preferably blown through the cooling jacket for added heat dissipation.

The reaction area may be comprising multiple elongated reaction chambers or ducts which then may be arranged to provide a combination of serial and parallel gas flows. The source of ultraviolet light also comprise multiple elongated ultraviolet light tubes. Additionally, the apparatus may further comprise a plurality of gas flow restricting baffles positioned within and along the reaction area.

The present process may further comprise the step of passing the gaseous stream through a particle collector, after exposure to the ultraviolet radiation, to collect the formed sorbent-metal complex from the gaseous stream. Preferably, electrostatic precipitators, filters or bag collectors are used to collect the particles, however, any method suitable for collecting particulate matter from a gaseous stream may be used as are well known in the art. A wet chemical scrubber may be provided which retains a quantity of an alkaline solution. The alkaline solution preferably comprises a 0.1–5.0 molar solution of, for example, $Ca(OH)_2$, $Na(OH)_2$, $Mg(OH)_2$, $NH_3(OH)_2$, or mixtures thereof, to provide a pH of approximately 11–13.

For the sorbent material, metal and/or ceramic powders may be utilized in accordance with the process of the present invention, wherein preferred metal, metalloid and/or ceramic powders are carbides, nitrides, borides, silicides, phosphites, sulphides, oxides and/or combinations thereof of the elements selected from the group consisting of metals, transition metals (e.g., Group 4b, 5b, 6b, 7b, and 8 of the Periodic Table), and metalloids and their mixtures and alloys, or these elements alone or in combination with one another.

Preferred sorbent powders include carbides, nitrides, borides, silicides, phosphites, sulphides, oxides and/or combinations thereof of the elements aluminum ("Al"), boron ("B"), cobalt ("Co"), chromium ("Cr"), iron ("Fe"), germanium ("Ge"), hafnium ("Hf"), lanthanum ("La"), molybdenum ("Mo"), nickel ("Ni"), niobium ("Nb"), palladium ("Pd"), platinum ("Pt"), silicon ("Si"), tin ("Sn"), tantalum ("Ta"), titanium ("Ti"), vanadium ("V"), tungsten ("W"), yttrium ("Y"), zinc ("Zn"), and zirconium ("Zr"), or these elements are alone or in combination with one another.

The more preferred sorbent is one made of ceramic oxides and their mixtures, such as tin oxide, aluminum oxide (alumina), silicon oxide (silica), chromium oxide, iron oxide, germanium oxide, vanadium oxide, zinc oxide, zirconium oxide, copper oxide or barium oxide. Mixed metal oxides, such as superconductors, are preferred.

The most preferred sorbent is one made of photocatalytic material such as titanium dioxide ($TiO_2$), or other sorbents such as silicon dioxide ($SiO_2$), tin oxide ($SnO_2$), aluminum oxide ($Al_2O_3$), vanadium oxide ($V_2O_5$), and germanium oxide ($GeO_2$) powders and most other oxides of metal elements in the periodic table and their composites. In addition, non-oxide powders such as silicon carbide, silicon nitride, titanium nitride, titanium diboride, and tungsten carbide may be used.

In another aspect of the invention, the sorbent which is utilized in the present invention may also optionally include a dopant material. Dopants which may be present in the sorbent include silicon, phosphorus, germanium, boron, tin, niobium, chromium, silver, gold, palladium, aluminum, and mixtures thereof Referring to FIG. 1, a flow chart is shown depicting a simple combustion system 10 which may be used with the inventive process. Air (or any other suitable oxidizing agent) and fuel are introduced into the furnace 12 of the combustion system 10. The combustion system may be a simple system, such as the one shown which includes a pollution control device 14, or a more complex system including, for example, an afterburner chamber, an energy recovery device, a stack or the like. Some of the more typical combustion systems include coal combusters, waste incinerators, steel smelters and metal foundries, for example. In its broadest sense, however, the specific combustion system used may be any apparatus or environment capable of supporting the oxidation of a sorbent precursor. The fuel may be any substance capable of being combusted at combustion system temperatures. For example, the fuel may be natural gas, coal, fuel oil or solid waste. Many such fuels contain trace amounts of toxic metals which may be harmful if emitted to the environment in sufficient quantities and which may be controlled by using the current process.

In addition, a sorbent precursor is fed into the combustion system. As used herein, the term "sorbent precursor" refers to any compound which oxidizes to form a stable sorbent. Organometallic compounds are particularly useful as sorbent precursors. Several useful sorbent precursor compounds include an element such as silicon, aluminum, titanium and/or calcium. A few examples of such compounds include hexamethyl disiloxane, silicon tetrachloride, titanium tetraisopropoxide, aluminum isopropoxide and calcium acetate.

The sorbent precursor may be introduced to the combustion system as a solid, liquid, gas, vapor, aerosol or combination thereof The liquid, gas, vapor and aerosol phases may be used to advantage because the sorbent precursor may be dispersed and mixed readily with the metal vapors existing in the combustion system. In addition, the energy required to disperse and mix a liquid or gas sorbent precursor should be less than that for a solid sorbent precursor.

The sorbent precursor may by introduced to the combustion system in any of a number of different ways. For example, a liquid sorbent precursor may be entrained in a carrier gas so as to form an aerosol which is delivered to the combustion system. Furthermore, the sorbent precursor may be introduced into the combustion system at any of a number of different locations along the system. For example, in a pulverized coal combuster, a sorbent precursor could be introduced prior to the furnace in the air stream that hydraulically conveys the pulverized coal to the furnace. Another strategy might be to coat the pulverized coal particles with a sorbent precursor solution upstream of the combustion chamber. For coal utilities, however, deposition onto heat exchanger surfaces must be considered. In this regard, tailoring of the agglomerate size distribution by increasing the sorbent precursor feed rate may prevent this potential problem. For rotary kiln incinerators, it may be more efficient to inject a vapor phase sorbent precursor into the duct work between the primary incinerator and the after burner, rather than mixing precursor solution with the waste prior to the primary incinerator.

Figure 1:
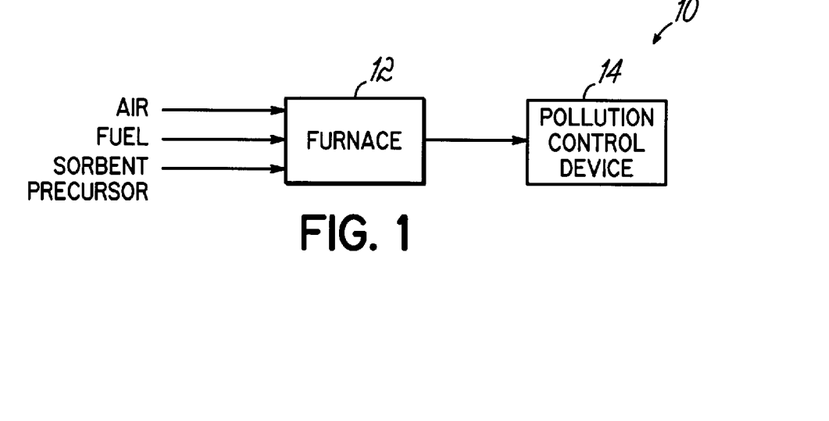
FIG. 1 is a flow diagram of a simple combustion system.

In a combustion system as shown in FIG. 1, once the sorbent precursor is introduced into the combustion system 10, the precursor is subjected to an elevated temperature, usually in the furnace 12, sufficient to oxidize the precursor and transform the precursor into sorbent particles. It is preferred to use an elevated temperature of at least about 500° C. More preferably, the temperature is at least about 750° C., and most preferably, at least about 1000° C. The sorbent particles may be any oxide derivatives of the sorbent precursors used in the process. A few examples include silica, alumina, titania, calcium oxide and combinations thereof. Alternatively, the sorbent precursor may be oxidized by another method, such as hydrolysis, for example.

One of the advantages of the sorbent particles formed using the inventive method is their extremely high surface area to volume ratio relative to that of traditional bulk solid sorbents. The surface area to volume ratio of the sorbent particles generated using the inventive process generally is at least about $0.01 \text{ nm}^2/\text{nm}^3$, and preferably is at least about $0.06 \text{ nm}^2/\text{nm}^3$.

As the sorbent precursor is being oxidized in the combustion system, it is being exposed to a metallic species. The term "metallic species" refers to any metal, in atomic or molecular form, or any metal-containing compound. The metallic species may include, for example, lead, arsenic, beryllium, cadmium, cobalt, chromium, mercury, manganese, nickel, antimony, selenium, vanadium, zinc, barium and/or iron. The metallic species also may include any of the alkali metals, such as lithium, sodium, potassium, rubidium, cesium and/or francium.

The metallic species may be provided in any of a number of different states. For example, the metallic species may be a solid, liquid, gas, vapor or aerosol when the sorbent precursor is being exposed to the metallic species. Typically, however, in a conventional combustion system, the volatile metallic species is in a vapor state, the vapor state being generated within the furnace portion of the combustion system simply by generating heat during the combustion process sufficient to vaporize a metallic species present in the fuel or which has been otherwise added to the combustion system. It is this metallic species vapor which is exposed to the sorbent. If desired, this metallic species vapor may even be generated outside the combustion system and introduced into the system for contact with the sorbent precursor or sorbent particles. If a metallic species and sorbent are introduced into the combustion system furnace, exposure of sorbent to metallic species vapor usually will occur in the furnace region and/or downstream of the furnace.

A sorbent-metal complex is formed by chemically reacting the sorbent precursor and metallic species. It is believed that much if not most of the sorbent precursor is transformed into sorbent particles before chemical reaction with the metallic species to form a sorbent-metal complex. However, the chemical reaction step and transformation of sorbent precursor into a particulate form may overlap in time, such that sorbent precursor is reacting with a metallic species as that sorbent precursor is being transformed into sorbent particles.

In a preferred form of the invention, sorbent precursor and/or particles and metallic species are exposed to a complex forming temperature whereby the metallic species reacts with the sorbent particles to form a sorbent-metal complex. This exposure to a complex-forming temperature causes at least a portion of the metallic species vapor to condense onto at least a portion of the sorbent particles, either after or during sorbent particle formation, and react with at least a portion of the sorbent particles, thereby forming a sorbent-metal complex.

The complex-forming temperature may be any temperature which enables the metallic species vapor to condense onto and react with the sorbent particles, i.e., the condensation temperature of the metal vapor. Generally, however, a temperature in the range of from about 0° C. to about 1330° C., and more preferably, from about 125° C. to about 1330° C., will cause the metallic species vapor to condense onto the surface of the sorbent particles. Furthermore, the preferred complex-forming temperature range may vary depending upon the composition of the sorbent particles. When the sorbent particles include silica, the complex forming temperature preferably ranges from about 25° C. to about 1330° C., more preferably, from about 225° C. to about 1330° C. When the sorbent particles include alumina, the complex-forming temperature preferably ranges from about 0° C. to about 1330° C., more preferably, from about 125° C. to 1330° C. When the sorbent includes titania, the complex-forming temperature preferably ranges from about 25° C. to about 1330° C., more preferably, from about 325° C. to about 930° C.

If desired, the complex-forming temperature may be achieved by actively controlling (for example, reducing) the temperature of a portion of the combustion system which contains sorbent particles and metallic species vapor. However, such active control generally is not required because, in a typical combustion system, the temperature in the system is progressively cooler as one moves further downstream from the furnace. Unlike the methods which use bulk solid sorbents, such as packed bed and fluidized bed methods and the like, the inventive process is able to take advantage of this phenomenon. With these bulk solid sorbent methods, the sorbent is contained in a relatively short space within the combustion system, and therefore experiences a relatively narrow range of temperatures. Furthermore, the metallic species vapor must react with the sorbent in this same relatively short space and narrow temperature range. However, because specific sorbents and metallic species vapors are more reactive at certain temperatures, the particular sorbent and metallic species are unlikely to be interacting at their preferred temperatures over this short distance and narrow temperature range. With the present invention, on the other hand, neither the sorbent particles nor the metallic species vapor is confined to a narrow temperature range. Instead, the particles and vapor are able to move downstream away from the elevated temperature and react at a complex-forming temperature suited for efficient reaction between the particular sorbent particle compound and particular metallic species vapor. The sorbent particles provide a surface onto which the metal vapor condenses. In addition to condensing on the sorbent particles, the metallic species vapors react with the sorbent particles thereby forming a sorbent-metal complex.

If desired, the present process may be practiced so as to produce a sorbent-metal complex having a desired particle size range. For example, sorbent-metal particles having an increased average particle size may be produced by adjusting the amount of sorbent precursor and metallic species so as to increase the atomic sorbent-to-metal molar feed ratio. Likewise, sorbent-metal particles having a decreased average particle size may be produced by adjusting the amount of sorbent precursor and metal so as to decrease the atomic sorbent-to-metal molar feed ratio. This ability to control particle size enables an operator to tailor sorbent-metal complex particle size to the requirements of the particular pollution control device being used, such as a filter, electrostatic precipitator or the like, thereby preventing the release of at least a portion of the metal to the atmosphere. For example, for sorbent-metal particles having a mean particle size greater than about 1 Fm, these particles may be removed by inertial deposition. While particles having a mean particles size less about 0.1 Fm may be removed by diffusion. Once sorbent-metal particles have been collected, the particles may be disposed. Depending upon the water-leachable fraction of the particles collected, the sorbent-metal particles may be suitable for disposable at nonhazardous waste landfills.

EXAMPLES

The following examples are provided by way of illustration and are not intended to limit the scope of the invention, which is determined by the claims.

Experimental Apparatus and Method for Examples 1–3

Figure 2:
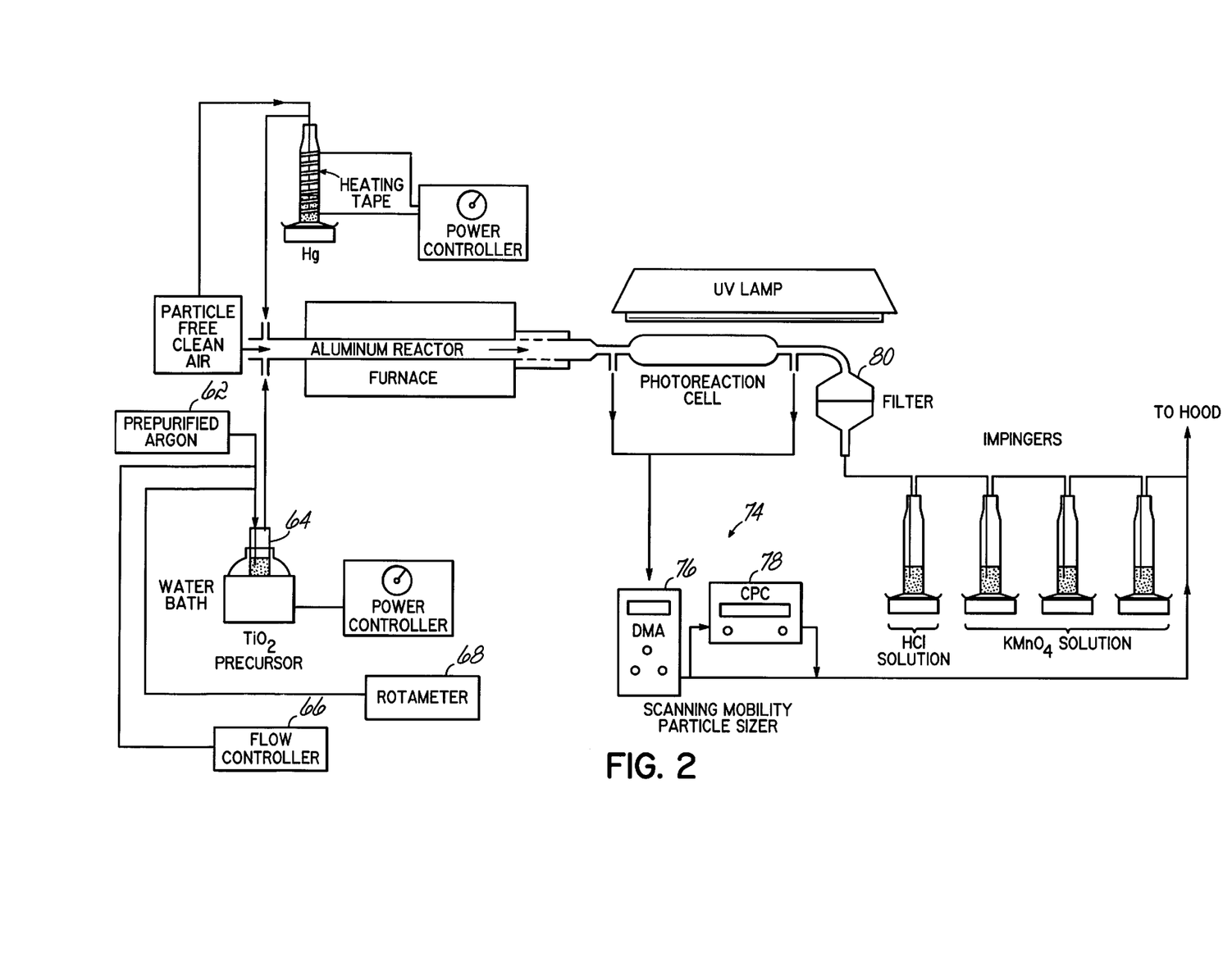
FIG. 2 is a schematic diagram of the experimental apparatus used to perform several of the examples.

Several experimental Examples are performed using the experimental apparatus shown in FIG. 2. A flow reactor with real-time measurement of particle size distribution and composition analysis is used to study the capture of mercury by in-situ generated titania particles with UV radiation. FIG. 2 shows the schematic of the experimental system.

The alumina reactor tube is 91.44 cm long with an inner diameter of 2.54 cm. Compressed air is used as the carrier gas and is passed through a HEPA filter (75-62 FT-IR purge gas generator, Balston Filter Products) to assure it is particle free. Mercury vapor is introduced into the system by passing air above liquid mercury contained in a gas washing bottle. The gas washing bottle is wrapped by a heating tape (Silicon Rubber, Thermolyne), and the temperature is controlled by adjusting the power controller (Type 45500, Thermolyne). To minimize mercury condensation, another heating tape is used for the Teflon tubing (that connected the exit of the bottle to the entrance of the furnace). Titania is introduced into the system by bubbling argon (prepurified, 99.99%, Wright Brothers) through titania precursor (titanium isopropoxide, 97%, Aldrich) contained in a bubbler (Midget, 30 ml, Ace Glass). The bubbler is placed in a water bath (No. 5160 wide neck flask, 500 ml, Pyrex; TM106 heating mantle, 500 ml, Glas-Col), the temperature of which is controlled by a power controller. The tubing before (connected to the argon source) and after (connected to the furnace entrance) the bubbler is wrapped by a heating tape to increase the feed rate and to prevent deposition, respectively. Argon gas flow from the gas source 62 to the reservoir 64 is controlled and measured by a flow controller 66 and Rotameter 68. Reactor residence times for the particular metal and sorbent precursor feeds ranged from about 0.02 sec. to about 0.3 sec.

When UV irradiation is to be used in conjunction with the sorbents, a photochemical reaction cell is placed after the exit of the reactor tube. The cell is 60 cm in length and 5 cm in diameter, and is made of borosilicate glass (No.7740, Pyrex). The transmittance of the glass is 94% for 360 nm, 72% for 320 nm and 30% for 300 nm. The UV lamp (Type XX-40, 80 W, Spectronics) is 120 cm long, and the intensity (for 365 nm at 25 cm) is 1850 FW/cm$^2$. A glass fiber filter (No.61663, Gelman Science) is used downstream to collect particles for composition analyses. The gas stream is then passed through a series of sampling impingers to capture mercury species in vapor phase. To measure particle size distribution in real time, tubings are connected to the system before and after the photochemical reaction cell to direct the sample particles to a Scanning Mobility Particle Sizer (Model 3934 SMPS, TSI Inc.). The SMPS 74 included a (DMA) 76 connected to a condensation particle counter (CPC) 78. The SMPS 74 measured the size distribution of the aerosol on a real time basis and provided information on mean particle size and deviation, particle number concentration (total number of particles/unit volume of gas, i.e., M the zeroeth moment of the size distribution, #/cm$^3$), total particle surface area concentration (nm$^2$/nm$^3$) and total particle volume concentration (total volume of particles/unit volume of gas, i.e., M1 the first moment of the size distribution, nm$^2$/nm$^3$). The bulk of the aerosol was collected on a glass fiber filter 80 for subsequent analysis by X-ray diffraction, infrared spectroscopy and Raman spectroscopy.

Three sets of experiments are conducted. In Set 1, UV irradiation is used (without sorbents) to test if there is any effect on mercury speciation. In Set 2, the capture of mercury by in-situ generated titania sorbent particles without UV irradiation is investigated. In Set 3, UV irradiation in conjunction with sorbents is used to examine the effects on Hg speciation. The experimental conditions for all these sets are listed in Table 1.

TABLE 1

Summary of the experimental conditions and collection efficiencies

| Set # | Hg inlet temp (° C.) | Hg flow rate (cc/min) | Ti inlet temp (° C.) | Ti flow rate (cc/min) | Ti/Hg | Total flow rate (cc/min) | Furnace temp (° C.) | UV | η (%) |
|---|---|---|---|---|---|---|---|---|---|
| 1 Hg + UV | 68 97 104 | 100 | na | na | na | 1000 | 1000 | Yes | 0 |
| 2 Hg + TiO$_2$ | 97 | 100 | 65 | 50 | 2.6 | 1000 | 400 750 1000 450 | No | 1.62 2.40 46.9 33.7 |
|  | 97 | 100 | 75 | 115 | 10.5 | 1000 | 750 1000 | No | 24.0 57.2 |
|  | 68 97 | 100 | 75 | 100 | 48.0 9.1 | 1000 | 1000 | No | 29.4 36.5 |
| 3 Hg + TiO$_2$ + UV | 85 68 | 100 | 75 | 100 | 17.5 48.0 | 1000 | 1000 | Yes | 48.0 56.3 |
|  | 85 | 100 | 75 | 100 | 17.5 | 1000 | 1000 | No | 1.10 |

In all the experiments, the total flow rate is maintained at 1 lmp. The corresponding residence time in the furnace is around 3 s, and that in the photochemical reaction cell is approximately 70 s. To understand the effects of feed rate, different titania to mercury ratios are used by varying the titania or mercury feed rates. The mercury feed rate is determined by measuring the mercury concentration in the impingers placed after the gas washing bottles. The titania feed rate is determined by weighing the particles collected on the filter with a titanium precursor only feed. The ratios are also estimated by the saturation vapor pressure (*CRC Handbook of Chemistry and Physics,* 64 ed., Weast, R. C., Astle, M. J. and Beyer, W. H. Ed. CRC Press, Inc., Boca Raton, Fla., 1983, p. B-116; Okuyama, K., Kousaka, Y., Tohge, N., Yamamoto, S., Wu, J. J., Flagan, R. C. and Seinfeld, J. H. *AIChE J.,* 1986, 32(12), 2010–2019) as $$\log P_{Hg} = \frac{-3143.28}{T} + 7.871936 \quad (1)$$

$$\text{and} \quad \log P_{Ti} = \frac{-7130.0}{T} + 21.2 \quad (2)$$

where P is in mmHg and T is in K. The furnace temperature is also varied to study its effect.

Particle size distribution is an important factor that affects the capture efficiency. The distribution is determined by SMPS, which provided information about the mean particle size, number concentration, volume concentration and standard deviation. Measurements are made until the system had stabilized, and at least three measurements are averaged for each run. To ensure there is no residual mercury in the system from previous experiments to affect the next experiment, the system is heated to a very high temperature with a high flow rate of air to flush the system and is checked by using the SMPS to ensure that background concentrations are attained. To determine the particle composition, the particles collected on the filter are analyzed by X-ray diffraction (Siemans D5000). The morphology of the particles is examined by Transmission Electron Microscopy (TEM, CM20, Philips) and Scanning Electron Microscopy (SEM). The elemental composition of the particles is determined by Energy Dispersive X-ray Spectroscopy (EDAX International, 9800 Plus). To determine the partition of mercury compounds in different phases, both the filter collection and the impinger solutions are analyzed by Cold Vapor Atomic Absorption spectroscopy (CVAA). The first sampling impinger that contained 0.1 M $HNO_3$ solution is used to determine the amount of soluble mercury species (i.e. HgO) (Chu, P. and Porcella, D. B. *Water, Air, Soil Pollut.* 1995, 80, 135–144; Morency, J. R. *PETC=s 10th Annual Coal Precapture, Utilization and Environmental Control Contractors Conference,* July 1994). The last three impingers that contained 0.4% $KMnO_4$ in 10% $H_2SO_4$ are used to determine the amount of elemental mercury (CFR, 1992, Title 40, Part61, Appendix B, Method 101 A). All the impingers are rinsed by 1 M $HNO_3$ solution. The sample collection time is 1 hour for all experiments.

Example 1
He+UV System

As radicals may already be generated in a UV environment, experiments (Set 1) are first conducted for mercury with UV only to investigate whether mercury oxidation occurred under this condition. However, the results of SMPS measurements showed no difference in particle size distribution from that of the background air only. In addition, the CVAA analysis of the filter and impinger collection indicated no mercury can be captured as particulates. Experiments using a higher power of UV (450 W, Xe arc lamp, Oriel) also showed the same results. Consequently, it is concluded that mercury is not oxidized when only UV radiation is applied.

Example 2
Hg+TiO2 System

Figure 3:
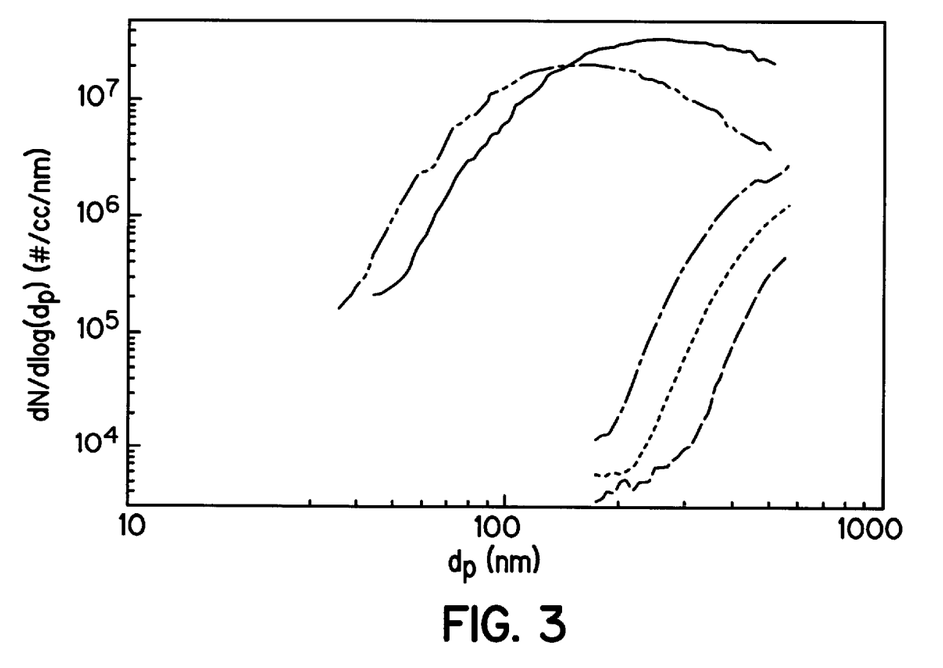
FIG. 3 is a graph of particle size distribution measured by SMPS (Hg+Ti: ____ is Ti@65° C. and ____ is Ti@75° C.; Hg+Ti+UV: ____ is Hg@68° C., - - - is Hg@85° C., and ____ is Hg@97° C.
Figure 4:
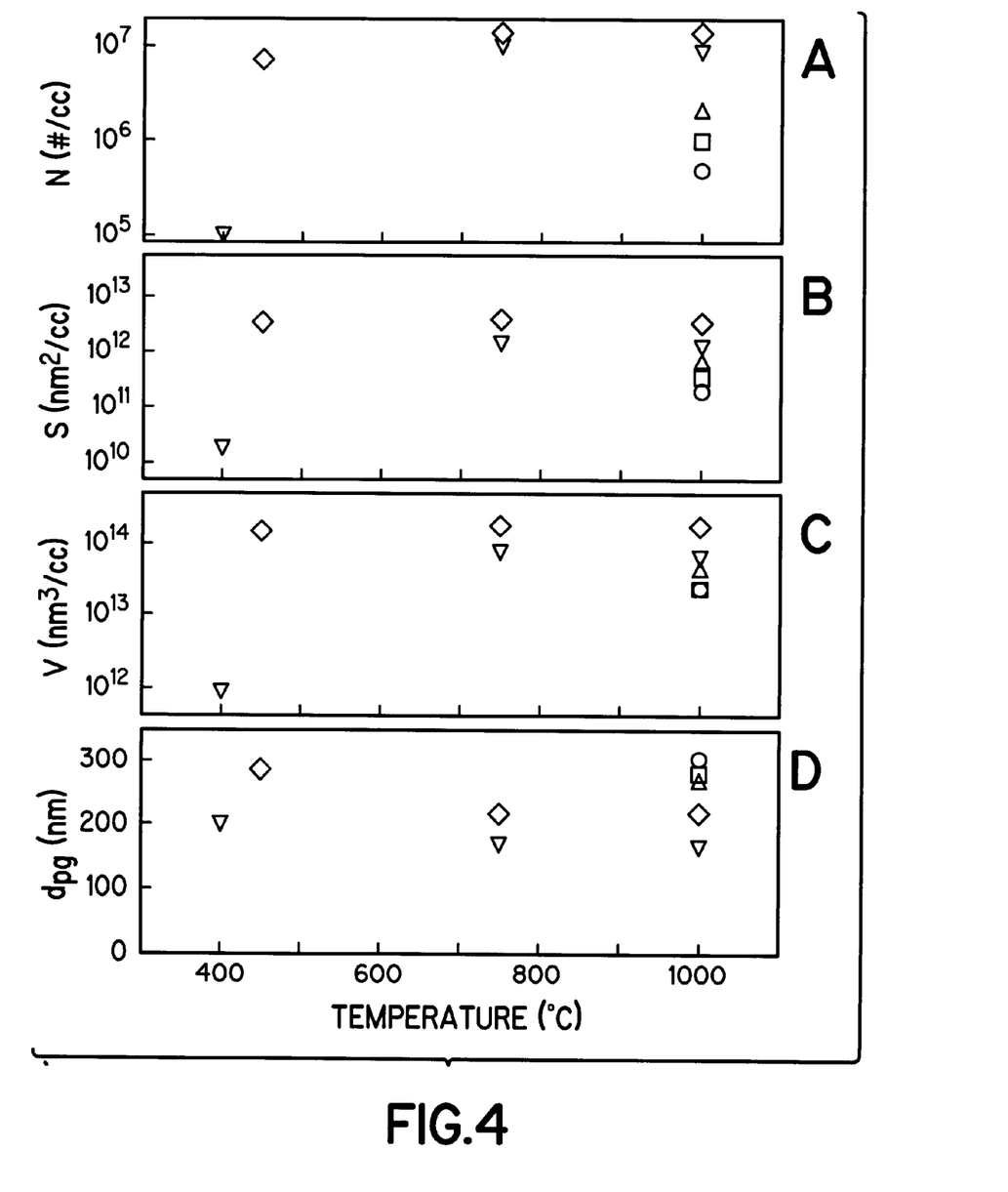
FIG. 4a is a graph of integral properties of the measured particle size distribution under different reactor temperature and reactor feed conditions (N(#/cc))
FIG. 4b is a graph of integral properties of the measured particle size distribution under different reactor temperature and reactor feed conditions (S(nm$^2$/cc))
FIG. 4c is a graph of integral properties of the measured particle size distribution under different reactor temperature and reactor feed conditions (V(nm$^3$/cc))
FIG. 4d is a graph of integral properties of the measured particle size distribution under different reactor temperature and reactor feed conditions ($d_{pg}$(nm))
Figure 5:
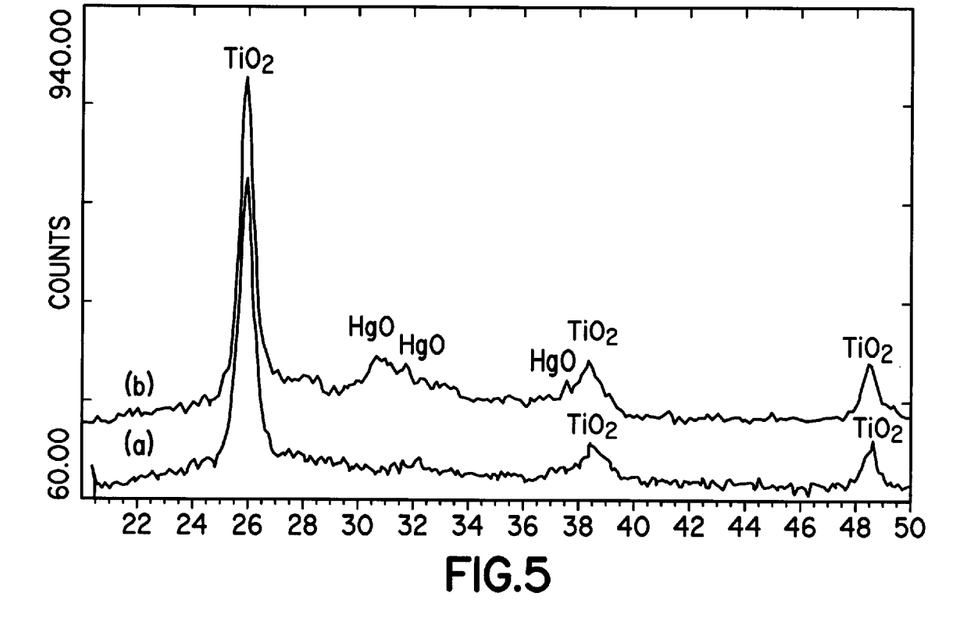
FIG. 5 is a graph of the x-ray diffraction patterns of the collected particles for (a) Ti only and (b) Hg+TiO2+UV experiments.

In Example 2, the capture of mercury by in-situ generated titania sorbent particles without UV radiation is investigated. The titanium isopropoxide introduced into the system decomposed at high temperatures and then resulted in formation of particles. Particle formation could be observed by SMPS measurements for furnace temperatures of 400° C. and beyond. The particle size distributions measured by SMPS are shown in FIG. 3, and the integral properties of the distributions are shown in FIG. 4. The particles collected on the filter are white in color and are identified by X-ray diffraction to be the anatase phase. The X-ray diffraction patterns of a typical run at 1000° C. are shown in FIG. 5.

Experiments are then conducted with a co-feed of titanium precursor and mercury. No discernible difference in the particle size distributions and the X-ray diffraction patterns from those of titania only feed could be observed. The collected particles also had the same white color as that of titania only feed. Nevertheless, the CVAA analyses of the particles collected on the filters did show that some mercury is captured on the titania particles. The above results suggested that mercury is probably physically adsorbed on the in-situ generated titania particles. Previous studies conducted in a suspension system also showed the adsorption capability of titania (Wu, C. Y., Arar, E. and Biswas, P. *89th Annual Meeting of the Air & Waste Management Assoc.,* Nashville, Tenn., Jun. 23–28, 1996). The physical adsorption on the in-situ generated particles is a very important step as will be illustrated in the next section with both $TiO_2$ and UV radiation.

The capture efficiency, which is defined as the mercury collected on the filter divided by the total collection (the filter and the impingers), is listed in Table 1. The results show that a higher furnace temperature results in a higher efficiency. This is probably due to the faster decomposition and subsequent earlier titania particle formation at higher temperatures., At 400° C., only a fraction of the precursor decomposed to form titania particles (low particle concentrations in FIG. 3). Thus, the efficiency is the lowest (Table 1). At 1000C, all the precursor had already formed titania particles, and the efficiency is therefore the highest. The results also show that the capture efficiency increases as Ti/Hg ratio increases. This is due to the higher surface area provided by the higher concentration of particles. However, it should be noted that the efficiency did not always increase as the Ti/Hg ratio increases. This suggests that the physically adsorbed mercury may re-evaporate easily. Hence, a more stable form of mercury captured by the particles is necessary, which will be demonstrated in the next section where UV radiation is also applied.

Example 3
Hg+TiO2+UV System

Figure 6:
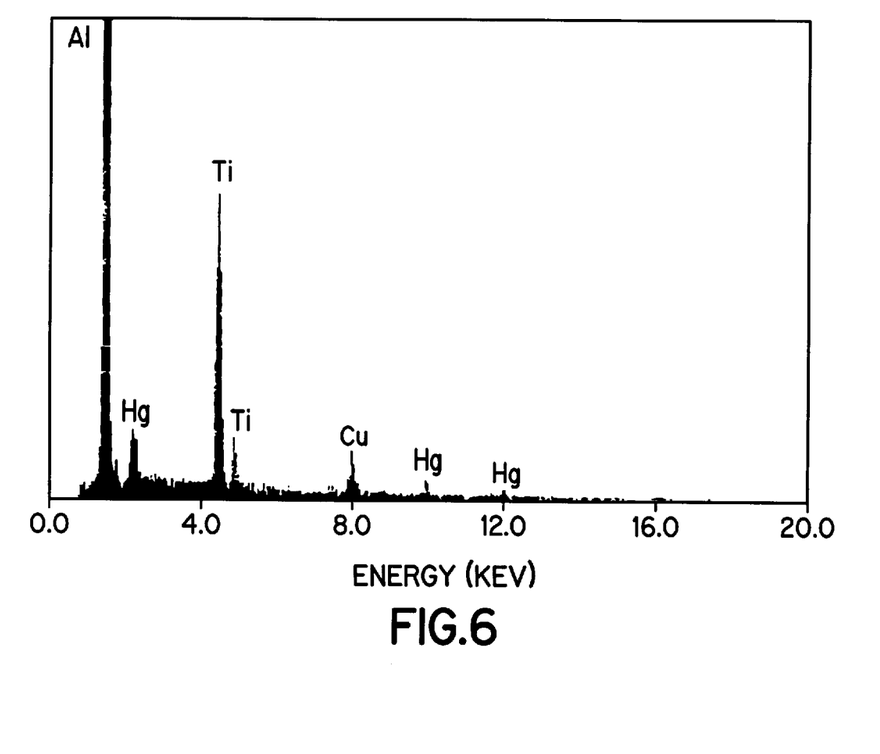
FIG. 6 is a graph of EDS.

In Example 3, a section of in-situ UV irradiation is added to the previous $Hg+TiO_2$ system to investigate its effectiveness. The collection efficiencies are listed in Table 1. The resultant particle size distributions are shown in FIG. 3, and the integral properties of the distributions are shown in FIG. 4. The X-ray diffraction is shown in FIG. 5. The EDS of the particles are shown in FIG. 6.

When UV irradiation is applied, the elemental mercury is oxidized to form mercury oxide. This is evidenced by the colors of the filter samples, which are yellowish-brown instead of white observed in the previous experiments (Set 2). These colors agree with previous reports on mercury oxide (Kaluza, U. and Boehm, H. P. *J. Catal.* 1971, 22, 347). The formation of mercury oxide is also evidenced by the X-ray diffraction pattern of the collected particles. The identified peaks match those of mercury oxide reported in the literature. As mercury oxide is more stable and the mercury oxide is in the particulate phase, this in-situ process is demonstrated to be an effective approach. To investigate whether the UV process is also effective and applicable after particles are collected, the filter samples of Set 2 ($Hg+TiO_2$ system) are exposed to UV radiation (450 W Xe arc lamp, Oriel) for 1 hour. No change of the color of the samples could be discerned. The X-ray diffraction patterns of these samples also showed no differences from those of titanium precursor only feed. Probably the thicker layer of these samples reduces the UV penetration and the therefore its effectiveness. From these results, it can be concluded that in-situ applied UV radiation is more effective.

The collection efficiency listed in Table I shows that the efficiency increases as the Ti/Hg ratio increases. This is also due to the higher surface area provided by the higher particle concentration as discussed in Set 2. Yet, the steady increase of the efficiency when UV is applied indicates that a stronger bond is formed with Hg and $TiO_2$. On the other hand, it seems that the efficiency decreases when UV is applied if we compare with the values of $Hg+TiO_2$ experiments. Nevertheless, it should be addressed that the configurations are different for these two tests. The photochemical reaction section added for the UV process increases the residence time (to 70 s from less than 0.3 s). Consequently, there are more wall losses of titania particles that carry mercury oxide. This is evidenced by the lower particle concentrations measured for the same titania feed rate. For example, the particle volume concentration by SMPS measurements is only 25% of that without UV. To confirm that the reduced efficiency is due to the particle deposition, one experiment without UV radiation is also conducted for this set-up (with the photochemical reaction cell). The collection efficiency is shown to be lower than that without the photochemical reaction cell confirming that the particle deposition on the wall causes the lower efficiency. In addition, notice that the efficiency is also shown to be smaller than that with UV radiation. Consequently, if the loss of titania particles is taken into account, the overall efficiency will be higher.

Corona discharge has been reported to be effective for mercury oxidation (Helfritch, D., Harmon, G. and Feldman, P. 89th Annual Meeting of Air & Waste Management Assoc., Paper 96-ES96.41, Nashville, Tenn., Jun. 23–28, 1996; Urabe, T., Wu. Y., Nagawa, T. and Masuda, S. *Seiso Giho*, 1988, 13, 12–29). It is expected that the mercury oxide will result in the nucleation of particles due to its low volatility. However, no data of the particle size distribution resulting from the subsequent particle formation have been reported. Meanwhile, studies of other metals in combustion environments show that the metallic particles formed by this route are located in the submicrometer range, a range in which the capture efficiency of typical particulate control devices is a minimum. The particle size distribution measured in this work, on the other hand, demonstrates the superiority of this $TiO_2$+UV process to the corona process. The geometric number mean particle size (FIG. 4) of the measurable particles is around 0.25 Fm, and the tail of the distribution (FIG. 3) shows that there are many particles beyond the detection limit (0.6 Fm). The TEM results also show the titania agglomerates are larger than 1 Fm. As mercury oxide formed in this process is associated with the agglomerates, it can be easily captured in typical particulate control devices with a high efficiency.

As stated earlier, the adsorption on the in-situ generated particles is very important. This is the first and necessary step for the transformation. As mercury is not oxidized in a UV environment (Set 1), it has to be adsorbed on the surface where it can be oxidized. On the other hand, although a fixed bed or fluidized bed of bulk titania particles also has the capability to physically adsorb mercury to a certain extent, the effectiveness is greatly reduced in such a process. The TEM results can better explain this point. The primary particles formed in this in situ process range from 7 nm to 40 nm, which are relatively small compared with the bulk particles. These small particles provide a much higher surface area for contact with mercury vapor as well as better exposure to UV irradiation. The superiority of the in-situ generated particles is evidenced by the results of composition analysis and the residence time required. The composition analyses by X-ray diffraction patterns and colors for particles with in-situ UV and UV after collection are different. Mercury oxide is identified for the in-situ UV condition but not for UV after the collection. One of the possible reason is that UV light can not effectively penetrate the titania layer on the filter while the nanosized primary particles in the gas stream can effectively absorb UV light. The other evidence is the short residence time required. The residence time in our photochemical reaction cell is approximately 70 seconds, much shorter than that reported in the literature (1.5–28 hrs) to observe the formation of oxide. The short residence time of this process is very important because it indicates the feasibility to apply this process to real combustion facilities for removing elemental mercury.

Example 4

Hg+Bulk TiO2+UV System

This example is similar to the previous examples, however, a sorbent precursor is not used (as described earlier). A sorbent is directly injected into the combustion environment. Such sorbents are known as bulk sorbents, and have been reported (see earlier references) to be not as effective as the in situ generated sorbents, primarily as their surface area/mass is not as large. However, bulk sorbents have been used for metals capture. In this example, photocatalytic titania particles are injected into a combustion system to capture Hg species. In fact, this has been demonstrated in bulk experiments performed in beakers with the bulk sorbent (titania particles as large as 300 micrometers) and mercury suspended in water. The results clearly indicated that the mercury could be immobilized by oxidation to mercury oxide. However, this process will require a larger residence time, primarily due to the smaller surface area per unit mass available for chemical reaction to take place.

This invention provides many benefits and advantages. Compared with current technologies to remove mercury, this process is better then the activated carbon because no additional section is required to be added to the existing pollution control devices. In addition, the titania precursor can be injected into the high temperature combustors directly and the process is not limited to the low applicable temperature range required for the use of activated carbon.

What is claimed is:

1. A process for enhancing complexation in a combustion system, comprising the steps of:

exposing a sorbent particle to a metallic species or an oxidized form of said metallic species, said sorbent particle being entrained during said exposing step; and irradiating said sorbent particle and said metallic species or said oxidized form of said metallic species with ultraviolet radiation thereby enhancing complexation of said sorbent particle and said metallic species or said oxidized form of said metallic species.

2. The process of claim 1 wherein the metallic species is selected from the group consisting of mercury ("Hg"), cadmium ("Cd"), and zinc ("Zn").

3. The process of claim 2 wherein the metallic species is a mercury-containing compound.

4. The process of claim 3 wherein the mercury-containing compound is selected from the group consisting of mercuric chloride, organomercuric compounds, other ionic and oxidized forms of mercury, and mixtures thereof.

5. The process of claim 2 wherein said sorbent particle is an oxide of a metal selected from the group consisting of aluminum, copper, iron, silicon, titanium, calcium and combinations thereof.

6. The process of claim 1 wherein said sorbent particle is an organometallic compound.

7. The process of claim 1 wherein said sorbent particle is selected from the group consisting of carbides, nitrides, borides, suicides, phosphites, sulphides, oxides, and mixtures thereof.

8. The process of claim 1 wherein said sorbent particle includes an element selected from the group consisting of aluminum ("Al"), boron ("B"), cobalt ("Co"), chromium ("Cr"), copper ("Cu"), iron ("Fe"), germanium ("Ge"), hafnium ("Hf"), lanthanum ("La"), molybdenum ("Mo"), nickel ("Ni"), niobium ("Nb"), palladium ("Pd"), platinum ("Pt"), silicon ("Si"), tin ("Sn"), tantalum ("Ta"), titanium ("Ti"), vanadium ("V"), tungsten ("W"), yttrium ("Y"), zinc ("Zn"), zirconium ("Zr"), and mixtures thereof.

9. The process of claim 1 wherein said sorbent particle is selected from the group consisting of titanium dioxide ($TiO_2$), silicon dioxide ($SiO_2$), tin oxide ($SnO_2$), aluminum oxide ($Al_2O_3$), vanadium oxide ($V_2O_5$), germanium oxide ($GeO_2$) chromium oxide, iron oxide, zinc oxide, zirconium oxide, copper oxide, barium oxide and mixtures thereof.

10. The process of claim 1 wherein said sorbent particle includes titanium dioxide ($TiO_2$).

11. The process of claim 1 wherein said sorbent particle further includes a dopant material.

12. The process of claim 11 wherein said dopant material is selected from the group consisting of silicon, phosphorus, germanium, boron, tin, niobium, chromium, silver, gold, palladium, aluminum, and mixtures thereof.

13. The process of claim 1 wherein said ultraviolet radiation is of a wavelength between about 170 nm and about 500 nm.

14. The process of claim 1 wherein said ultraviolet radiation is of a wavelength between about 185 nm and about 410 nm.

15. The process of claim 1 wherein said ultraviolet radiation is of a wavelength between about 290 nm and about 400 nm.

16. The process of claim 1 wherein said ultraviolet radiation is of a wavelength between about 320 nm and about 390 nm.

17. The process of claim 1 wherein said ultraviolet radiation is emitted from a source selected from the group consisting of arc emission, laser, and corona discharge.

18. The process of claim 1 wherein said sorbent-metal complex is exposed to said ultraviolet radiation in a reaction area comprising multiple elongated reaction chambers.

19. The process of claim 18 wherein said reaction area further comprises a plurality of gas flow restricting baffles positioned within and along said reaction area.

20. The process of claim 1 wherein said ultraviolet radiation is emitted from a source comprising multiple elongated ultraviolet light tubes.

21. The process of claim 1 wherein said process further comprises the step of passing said sorbent-metal complex through a particle collector after exposure to said ultraviolet radiation, to collect at least a portion of said sorbent-metal complex.

22. A process for enhancing complexation in a combustion system, comprising the steps of:
introducing a sorbent particle into a combustion system;
exposing said sorbent particle to a metallic species or an oxidized form of said metallic species, said sorbent particle being entrained during said exposing step; and
irradiating said sorbent particle and said metallic species or said oxidized form of said metallic species with ultraviolet radiation thereby enhancing complexation of said sorbent particle and said metallic species or said oxidized form of said metallic species.

23. The process of claim 22 wherein said sorbent is introduced into said combustion system in a form selected from the group consisting of a gas, a vapor, a liquid, an aerosol and combinations thereof.

24. The process of claim 22 wherein said sorbent includes an element selected from the group consisting of silicon, aluminum, titanium, calcium and combinations thereof.

25. The process of claim 22 wherein said sorbent is selected from the group consisting of silicon carbide, silicon nitride, titanium nitride, titanium diboride, titanium dioxide, tungsten carbide and mixtures thereof.

26. The process of claim 22 wherein said sorbent includes titanium dioxide ($TiO_2$).

27. The process of claim 22 wherein said sorbent is introduced into said combustion system in an amount sufficient to provide a molar feed ratio of sorbent to said metallic species of at least about 4.5:1.

28. A process for enhancing complexation in a combustion system, comprising the steps of:
oxidizing at least a portion of a sorbent precursor thereby forming a sorbent particle;
exposing said sorbent precursor or said sorbent particle to a metallic species or an oxidized form of said metallic species, said sorbent precursor or said sorbent particle being entrained during said exposing step; and
irradiating said sorbent precursor or said sorbent particle, and said metallic species or said oxidized form of said metallic species, with ultraviolet radiation thereby enhancing complexation of said sorbent precursor or said sorbent particle and said metallic species or said oxidized form of said metallic species.

29. The process of claim 28 wherein said sorbent precursor is oxidized by a method selected from the group consisting of hydrolyzing said sorbent precursor, exposing said sorbent precursor to an elevated temperature, exposing said sorbent precursor to ultraviolet radiation and combinations thereof.

30. The process of claim 28 wherein at least a portion of said sorbent precursor is transformed into sorbent particles during said oxidation step.

31. The process of claim 30 wherein said sorbent particles are oxides of metals selected from the group consisting of aluminum, silicon, titanium, calcium and combinations thereof.

32. The process of claim 28 wherein said sorbent precursor includes an element selected from the group consisting of silicon, aluminum, titanium, calcium and combinations thereof.

33. The process of claim 28 wherein said sorbent precursor is an organometallic compound.

34. The process of claim 28 wherein said sorbent precursor is selected from the group consisting of hexamethyl disiloxane, silicon tetrachloride, tetraethoxysilane, titanium tetraisopropoxide, aluminum isopropoxide, calcium acetate and combinations thereof.

35. The process of claim 28 wherein said sorbent precursor includes hexamethyl disiloxane.

36. A process for enhancing complexation in a combustion system, comprising the steps of:
introducing a sorbent precursor into a combustion system;
oxidizing at least a portion of said sorbent precursor thereby forming a sorbent particle;
exposing said sorbent precursor or said sorbent particle to a metallic species or an oxidized form of said metallic species, said sorbent precursor or said sorbent particle being entrained during said exposing step; and
irradiating said sorbent precursor or said sorbent particle, and said metallic species or said oxidized form of said metallic species, with ultraviolet radiation thereby enhancing complexation of said sorbent precursor or said sorbent particle and said metallic species or said oxidized form of said metallic species.

37. The process of claim 36 wherein said sorbent precursor is oxidized by a method selected from the group consisting of hydrolyzing said sorbent precursor, exposing said sorbent precursor to an elevated temperature, exposing said sorbent precursor to ultraviolet radiation and combinations thereof.

38. The process of claim 37 wherein said elevated temperature is at least about 500° C.

39. The process of claim 37 wherein said elevated temperature is at least about 750° C.

40. The process of claim 37 wherein said elevated temperature is at least about 1000° C.

41. The process of claim 36 wherein at least a portion of said sorbent precursor is transformed into sorbent particles during said oxidation step.

42. The process of claim 36 wherein said sorbent particles have an average diameter of about 170 nm or less.

43. The process of claim 36 wherein said sorbent particles have a surface area to volume ratio of at least about 0.01 $nm^2nm^3$.

44. The process of claim 36 wherein said sorbent particles have a surface area to volume ratio of at least about 0.06 $nm^2/nm^3$.

* * * * *